July 14, 1925.  
A. S. KROTZ  
ROLLER CULTIVATOR  
Filed Sept. 6, 1921

Inventor:  
ALVARO S. KROTZ  
By his Attorneys,

July 14, 1925.  1,545,564
A. S. KROTZ
ROLLER CULTIVATOR
Filed Sept. 6, 1921   3 Sheets-Sheet 3

Inventor:
ALVARO S. KROTZ
By his Attorneys:
Blackmore, Spencer & Flint.

Patented July 14, 1925.

1,545,564

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

ROLLER CULTIVATOR.

Application filed September 6, 1921. Serial No. 498,633.

*To all whom it may concern:*

Be it known that I, ALVARO S. KROTZ, a citizen of the United States of America, and a resident of Janesville, county of Rock, and State of Wisconsin, have invented certain new and useful Improvements in Roller Cultivators, of which the following is a full, clear, concise, and exact description, such as will enable others skilled in the art to which the invention relates to make and use the same, reference being made therein to the accompanying drawings, which form a part of this specification.

My invention relates to agricultural implements for use in tilling the soil; and particularly to implements of the type commonly referred to as roller cultivators, because they include a plurality of teeth adapted to dig into the ground in a manner similar to cultivator teeth, and a roller arranged behind the teeth and adapted to crush clods and leave the soil in proper condition for planting or sowing. Although referred to as a "cultivator" the implement wherein my invention consists is not intended, primarily, for use in cultivating growing crops; and the teeth which form a part thereof while shown as teeth such as cultivators are usually equipped with may be replaced by teeth such as are used in harrows, or by other teeth adapted to dig up the soil. In fact the teeth of the implement illustrated could as well be designated as harrow teeth, as cultivator teeth.

The principal object of my invention is to provide an implement of the class referred to having improved mechanism for connecting the roller and roller frame with the cultivator frame, and to provide improved mechanism for adjusting the two frames relative to one another to thereby vary the depth to which the cultivator teeth enter the ground.

A further object of my invention is to provide certain improvements in and relating to various elements and parts of an implement of the type or class above referred to, all as will hereinafter more fully appear.

With the above and other objects of invention in view, my invention consists in the improved roller cultivator illustrated in the accompanying drawings and hereinafter described and claimed; and in such variations and modifications thereof, within the scope of the concluding claims, as will be obvious to those skilled in the art to which my invention relates.

In the drawings accompanying and forming a part of this specification and wherein the preferred embodiment of my invention is illustrated:

Figure 7:
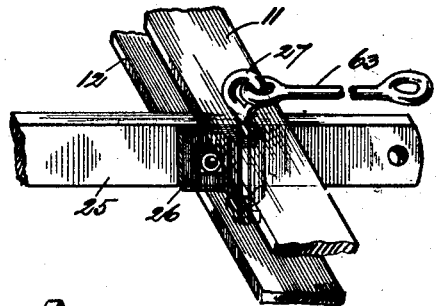
Figure 7 is a fragmentary perspective view showing the manner in which a central spacing link for the roller carrying frame is connected with the cultivator frame of the implement.
Figure 8:
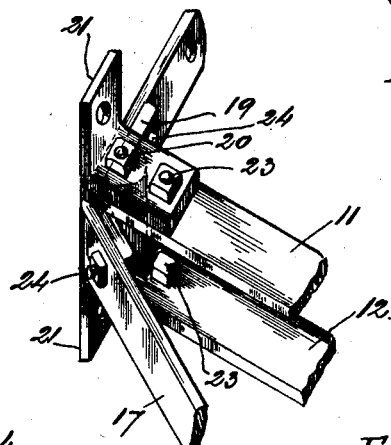
Figure 8 is a similar view showing how the ends of two teeth carrying gang bars of the cultivator frame are connected with the side bars of the frame.

Referring now to the drawings, the reference numerals 11, 12 designate two gang bars extending transversely to the path of travel of the implement or substantially so and disposed one above the other, and which bars are spaced apart and serve as a support for a series of alternately arranged front and rear cultivator teeth; the front teeth being designated by the reference numerals 13 and having straight shanks 14, while the rear teeth 15 have bent shanks 16 whereby they are held in positions to the rear of the front teeth. The ends of these gang bars are secured to the forwardly converging side or draft bars 17, 18 of the cultivator frame (said gang bars also constituting a part of the cultivator frame regarded in its entirety as will be appreciated) as by means of connecting brackets 19, one at each end of the pair of gang bars (although the far or right hand bracket only is shown in full), and bolts 20 extending through passages in the brackets and through registering holes in the gang bars, as best shown in Figure 8. Draft brackets 21, 21 and 22, 22 right angular in form, are shown as secured in place at the ends of the gang bars 11, 12 by the bolts 20, and by additional bolts 23 extending through said gang bars; and the connecting brackets 19 are fastened to the draft bars 17, 18 by bolts 24 extending through registering holes in said brackets and draft bars. A central frame bar 25 extends at its rear end between the gang bars 11, 12 as best shown in Figure 7; and the three bars or frame members are secured together as by means of a clip 26 fastened to the central frame bar and an eye bolt 27 the shank of which extends through registering openings in said gang bars and said clip. The front ends of the side and central frame bars are secured together as by means of bolts 28, and a draw head 29 whereby the implement may be drawn by a tractor or other agency is fastened between the forward ends of the outer frame bars as by bolts 30; although it will be appreciated that rivets or equivalent fastening elements may be used instead of bolts in each instance wherein bolts have been hereinbefore referred to.

The various bars and connecting members above referred to form the cultivator frame of the implement wherein my invention consists, the rear transverse bars 11, 12 thereof being also properly designated as gang bars because they serve as a support for the series of cultivator teeth 13, 15 which collectively constitute a cultivator gang.

Figure 9:
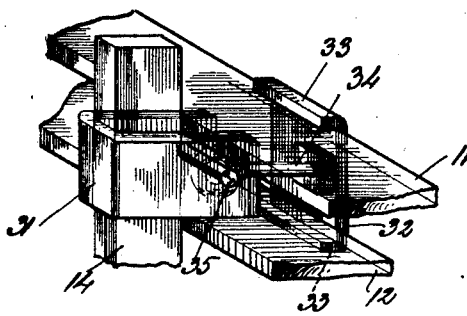
Figure 9 is a fragmentary view showing one of the holding devices for the front teeth of the cultivator gang in perspective.

The manner in which the front teeth 13 are adjustably fastened to the gang bars 11, 12 is most clearly shown in Figure 9. Referring thereto, the reference numeral 31 designates a U-shaped clip the vertical height or thickness of which is substantially the same as the distance apart of the gang bars so that it fits closely between them, and the inside width of which corresponds approximately with the lesser dimension or width of the tooth shank 14; so that the shank can have but little sidewise movement without such movement being arrested by the side portions of the U-shaped clip. A saddle plate 32 is disposed opposite the clip 31 and has flanges 33 at its upper and lower ends which hook over the rear edges of the gang bars and hold the saddle plate in place, and at the same time prevent the bars from spreading. The numeral 34 designates an eye bolt the threaded shank of which extends through a hole in the saddle plate and the eye of which receives a pin 35 which extends through holes adjacent the free ends of the sides of the U-shaped clip 31.

The above construction permits the clip 31 and saddle plate 32 to be moved along the gang bars to adjust the teeth along the same, and the tooth shank to move up and down within the clip to adjust the tooth vertically; while the fact that the shanks of the teeth fit closely between the sides of the clip and the clip fits tightly in between the gang bars, together with the holding action of the overhanging ledges 33 of the saddle plate, prevents sidewise tipping of the tooth when the eye bolt 34 is tightened to fasten the parts together. When the tooth is properly adjusted and the eye-bolt tightened there is no possibility of sidewise tipping of the tooth shank independently of the clip and of the gang bars, as all forces tending to produce such sidewise tipping are transmitted through the tooth holding mechanism above described to the gang bars through non-yieldable elements which are in direct contact with one another at all times.

Figure 10:
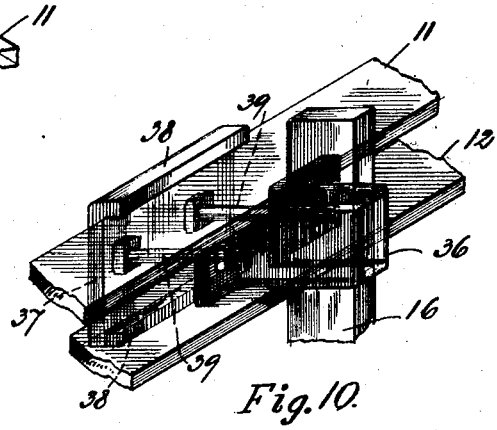
Figure 10 is a similar view showing the mechanism for securing one of the rear teeth of the cultivator to the gang bars whereby all the teeth are carried.

Likewise the rear teeth 15 of the gang are adjustably held upon the gang bars and prevented from tipping sidewise by holding means the elements of which are non-yielding in character throughout, and similar in construction and operation to those above referred to for the front teeth; said means comprising in each case a U-shaped holding clip 36, see Figure 10, the height of which corresponds with the distance between the gang bars, a saddle plate 37 having ledges 38 which hook over the front edges of the gang bars, and bolts 39 which extend through holes in the saddle plate and in outwardly bent lugs at the ends of the side portion of the clip.

Figure 1:
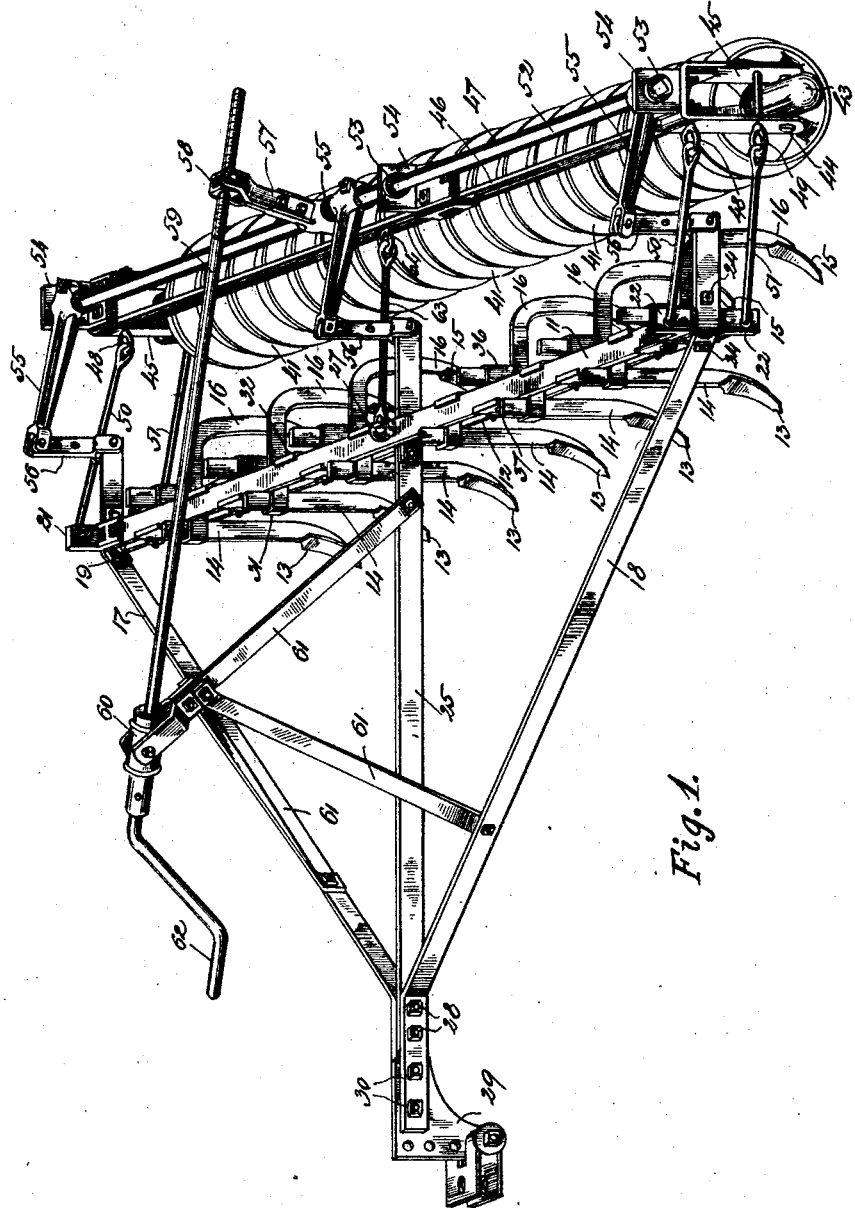
Figure 1 is a view showing my improved roller cultivator in perspective.
Figure 2:
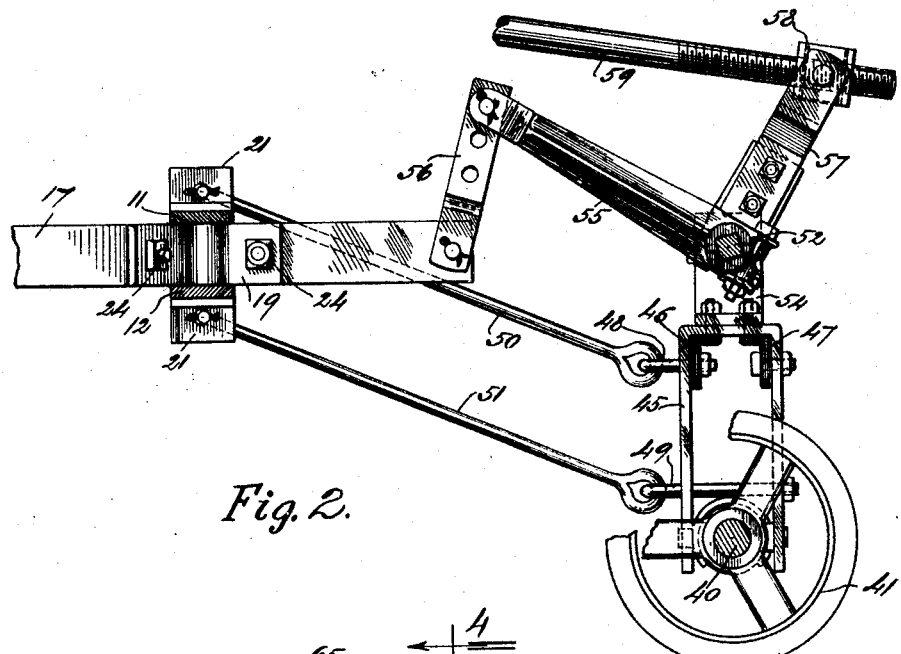
Figure 2 is a fragmentary view illustrating the principal parts of an adjusting mechanism for varying the relative positions of the roller and the teeth of the implement.
Figures 3, 4:
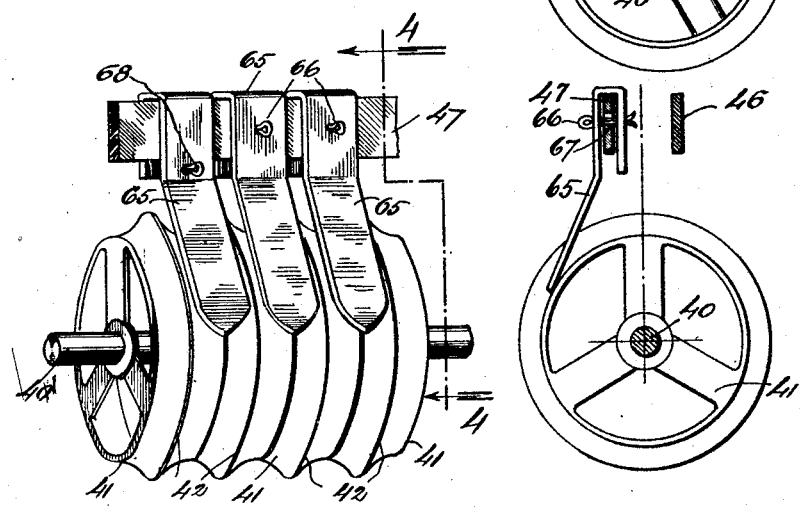
Figures 3 and 4 are fragmentary views showing scraper mechanism for keeping the wheels of the roller clean.

The roller mechanism of my improved roller cultivator comprises a disc or wheel supporting shaft 40 upon which a series of independent discs or wheels 41 are supported and upon which they are independently rotatable; said wheels having each a central ridge 42 as shown in Figure 3 so that the action of the wheels will be to form ridges with intervening depressions or channels in the soil upon which the implement operates.

Figure 5:
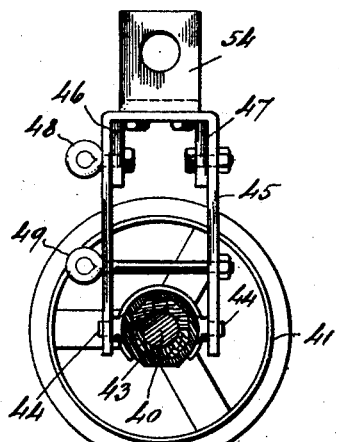
Figure 5 is a view showing one of the two bearing brackets for supporting the ends of the roller shaft.
Figure 6:
Figure 6 is a view showing one of three bearing sleeves whereby a square roller adjusting shaft of the implement is supported in round bearings carried by the roller frame.

The ends of the roller shaft 40 are supported in bearings 43 having trunnions 44, see Figure 5, whereby said ends are supported between the lower ends of two vertically arranged U-shaped end frame members 45 secured to and depending from two transversely extending frame bars 46, 47, the parts being fastened together by bolts or equivalent fastening members as shown to thereby provide a roller supporting frame. The end frames are provided with eye bolts 48, 49 spaced apart vertically; and the numerals 50, 51 designate upper and lower draft links disposed parallel with one another in pairs at each end of the roller frame, the same having eyes at their rear ends interengaged with the eye bolts 48, 49. The front ends of these links are bent at right angles and extend through holes provided in the draft brackets 21, 22 hereinbefore referred to and wherein said forward ends are shown as retained by suitable cotter pins.

The draft connections above described provide mechanism whereby the roller frame and roller wheels are pivotally connected with and are drawn from the cultivator frame; and provide also mechanism whereby the end frames 45, 45 are maintained in vertical positions, because of the parallel arrangement of the draft links, whatever may be the relative positions vertically of the cultivator and roller frames of the implement.

The cultivator and roller frames are adjusted vertically relative to one another to thereby vary the depth to which the cultivator teeth enter the soil by means of an angularly adjustable shaft 52 shown as square in cross-section and which shaft is supported in three bearing sleeves 53 rotatably supported in bearings 54 carried by the roller frame and extending upwardly therefrom.

Secured to the adjusting shaft 52 and extending forwardly therefrom are three arms 55 the forward ends of which are pivotally and adjustably connected with a like number of vertically disposed links 56, and the lower ends of which are similarly connected with rearward extensions of the cultivator frame bars 17, 18 and 25; and the numeral 57 designates an arm secured to and extending upward from the bar 52 and having a trunnion nut 58 at its upper end through which the threaded rear end of a rotatable adjusting rod 59 extends. The front end of the rod 59 is rotatably supported in a trunnion sleeve 60 which in turn is supported at the upper end of a tripod made up of bars 61, the lower ends of which are secured to the cultivator frame bars; and a crank 62 is provided for rotating said rod to thereby impart angular movement to the adjusting shaft 52 and vary the relative levels of the cultivator and roller frames, because of the connections between the two frames provided by the arms 55 and the links 56; the roller frame being kept upright in all adjustments by the pairs of parallel draft links 50, 51 at the ends thereof, and the rear end of the cultivator frame being always supported from the ground by the roller, the roller frame, and the connecting mechanism between the cultivator and roller frames, as will be understood.

It will also be understood that the roller adjusting mechanism above described provides an implement wherein the roller as a whole may be depressed to such an extent that the teeth will clear the ground; thus permitting the implement to be drawn along a roadway or over a field with its rear end supported by the roller, and with its teeth held up and away from the surface over or along which the same is moving; which is a feature of importance in drawing the implement to a field, in turning corners, and in other cases, where it is required that the teeth be prevented from entering the soil.

The middle portions of the cultivator and roller frames are shown as connected with one another by a link 63 having eyes at its ends which connect with the eye bolt 27 hereinbefore mentioned and with an eyebolt 64 carried by the roller frame, whereby said middle portions are kept properly spaced apart and possible bending of the roller frame is prevented.

The reference numeral 65 designates scrapers carried by the rear frame bar 47 of the roller frame and the lower properly shaped ends of which lie in the grooves between the ridges 42 of adjoining roller wheels 41, the purpose of said elements being to prevent the accumulation of dirt in the grooves, as will be understood. The roller wheels are quite loose upon the roller shaft and are capable of considerable sidewise movement along the same; and the scrapers are loosely connected with the frame bar 47 so that their lower ends are free to swing sidewise and follow such movement of the rollers along the shaft as occurs as by means of pins 66 extending through the sides of loops provided at the upper ends of the scrapers, and through comparatively large holes 67 in the scraper bar, or by means of a pin 68 lying entirely below the roller frame bar, all as clearly shown in Figures 3 and 4 of the drawings.

Having thus described and explained my invention, I claim and desire to secure by Letters Patent:

1. In a roller cultivator of the class described, a cultivator frame; means at the front end of said cultivator frame whereby the same may be connected with a suitable hauling agency; a plurality of cultivator teeth carried by said cultivator frame; a transversely extending roller frame pivotally connected with the rear end of said cultivator frame and movable vertically relative thereto; a ground engaging roller carried by said roller frame; an angularly adjustable shaft carried by said roller frame; means for adjusting said shaft angularly; and means whereby the rear end of said cultivator frame is supported from said roller and roller frame through said shaft.

2. In a roller cultivator of the class described, a cultivator frame; means at the front end of said cultivator frame whereby the same may be connected with a suitable hauling agency; a plurality of cultivator teeth carried by said cultivator frame; a transversely extending roller frame pivotally connected with the rear end of said cultivator frame and movable vertically relative thereto; a ground engaging roller carried by said roller frame; an angularly adjustable shaft carried by said roller frame; means carried by said cultivator frame for adjusting said shaft angularly; a plurality of forwardly extending arms carried by said shaft; and links through which the free ends of said arms are pivotally connected with the rear end of said cultivator frame.

3. In a roller cultivator of the class described, a cultivator frame; means at the front end of said cultivator frame whereby the same may be connected with a suitable hauling agency; a plurality of cultivator teeth carried by said cultivator frame; a transversely extending roller frame comprising two vertically arranged end frame members, and means for connecting said end frame members together; a ground engaging roller supported in bearings carried by and located adjacent the lower ends of said end frame members; connecting mechanism whereby said roller frame is connected with the rear end of said cultivator frame, and whereby said end frame members are held in vertical positions and are drawn by said cultivator frame; and means for adjusting said roller frame and the rear end of said cultivator frame vertically relative to one another.

4. In a roller cultivator of the class described, a cultivator frame; means at the front end of said cultivator frame whereby the same may be connected with a suitable hauling agency; a plurality of cultivator teeth carried by said cultivator frame; a transversely extending roller frame comprising two vertically arranged end frame members, and means for connecting the upper ends of said end frame members together; a ground engaging roller supported in bearings carried by and located adjacent the lower ends of said end frame members; draft mechanism whereby said end frame members are connected with the rear end of said cultivator frame and whereby said members are held in upright poistions; and means carried by said roller frame and cooperating with said draft mechanism whereby said roller frame and the rear end of said cultivator frame may be adjusted vertically relative to one another.

5. In a roller cultivator of the class described, a cultivator frame; means at the front end of said cultivator frame whereby the same may be connected with a suitable hauling agency; a plurality of cultivator teeth carried by said cultivator frame; a transversely extending roller frame comprising two vertically arranged end frame members, and means for connecting the upper ends of said end frame members together; a ground engaging roller supported in bearings carried by and located adjacent the lower ends of said end frame members; two draft links associated with each of said end frame members, said links being arranged one above the other and their forward ends being pivotally connected with said cultivator frame, and their rear ends being pivotally connected with the end frame member; an angularly adjustable shaft carried by said roller frame; means for adjusting said shaft angularly; and means whereby the rear end of said cultivator frame is supported from said ground engaging roller through said roller frame and said shaft.

6. In a roller cultivator of the class described, a cultivator frame; means at the front end of said cultivator frame whereby the same may be connected with a suitable hauling agency; a plurality of cultivator teeth carried by said cultivator frame; a transversely extending roller frame comprising two vertically arranged end frame members, and means for connecting the upper ends of said end frame members together; a ground engaging roller supported in bearings carried by and located adjacent the lower ends of said end frame members; two draft links associated with each of said end frame members, said links being arranged one above the other and their forward ends being pivotally connected with said cultivator frame, and their rear ends being pivotally connected with the end frame member; an angularly adjustable shaft carried by said roller frame; means carried by said cultivator frame and operatively connected with said shaft for adjusting the same angularly; a plurality of forwardly extending arms carried by said shaft; and links intermediate the free ends of said arms and the rear end of said cultivator frame and through which said rear end is supported from said ground engaging roller through said roller supporting frame, said shaft and the arms aforesaid.

In testimony whereof I affix my signature.

ALVARO S. KROTZ.